United States Patent
Wang et al.

(10) Patent No.: US 12,231,223 B2
(45) Date of Patent: Feb. 18, 2025

(54) SATELLITE CELL RESELECTION CONTROL METHOD AND RELATED DEVICE

(71) Applicant: HUAWEI TECHNOLOGIES CO., LTD., Guangdong (CN)

(72) Inventors: Yu Wang, Hangzhou (CN); Xian Meng, Hangzhou (CN); Meixin Lin, Hangzhou (CN); Yunfei Qiao, Hangzhou (CN); Yinggang Du, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 364 days.

(21) Appl. No.: 17/564,643

(22) Filed: Dec. 29, 2021

(65) Prior Publication Data

US 2022/0124581 A1    Apr. 21, 2022

Related U.S. Application Data

(63) Continuation of application No. PCT/CN2020/098784, filed on Jun. 29, 2020.

(30) Foreign Application Priority Data

Jun. 29, 2019    (CN) .......................... 201910581558.6

(51) Int. Cl.
*H04B 7/185*    (2006.01)
*H04W 36/00*    (2009.01)
(Continued)

(52) U.S. Cl.
CPC ..... *H04B 7/18554* (2013.01); *H04B 7/18523* (2013.01); *H04W 36/0064* (2023.05);
(Continued)

(58) Field of Classification Search
None
See application file for complete search history.

(56) References Cited

U.S. PATENT DOCUMENTS 11,510,114 B2 *   11/2022   Yiu .................... H04W 36/165
2011/0098046 A1    4/2011   Shin
(Continued)

FOREIGN PATENT DOCUMENTS

CN    102958123 A    3/2013
CN    108882321 A    11/2018
(Continued)

OTHER PUBLICATIONS

Office Action issued in Chinese Application No. 201910581558.6 on Apr. 26, 2021, 9 pages (with English translation).
(Continued)

*Primary Examiner* — Willie J Daniel, Jr.
(74) *Attorney, Agent, or Firm* — Fish & Richardson P.C.

(57) ABSTRACT

Satellite cell reselection control methods and related devices are provided. One satellite cell reselection control method includes: determining a current location status of the user equipment; determining a satellite cell reselection control parameter set corresponding to the current location status; and the performing satellite cell reselection control of the user equipment based on the obtained satellite cell reselection control parameter set.

14 Claims, 15 Drawing Sheets

(51) Int. Cl.
*H04W 36/08* (2009.01)
*H04W 36/30* (2009.01)
*H04W 36/32* (2009.01)

(52) U.S. Cl.
CPC . *H04W 36/0072* (2013.01); *H04W 36/00838* (2023.05); *H04W 36/083* (2023.05); *H04W 36/302* (2023.05); *H04W 36/322* (2023.05); *H04B 7/185* (2013.01); *H04W 36/324* (2023.05)

(56) References Cited

U.S. PATENT DOCUMENTS

2011/0143752 A1  6/2011  Hong
2019/0387440 A1* 12/2019  Yiu ..................... H04W 36/165

FOREIGN PATENT DOCUMENTS

| CN | 109089292 A | 12/2018 |
| CN | 109257786 A | 1/2019 |
| CN | 111294733 A | 6/2020 |
| WO | 2018156696 A1 | 8/2018 |

OTHER PUBLICATIONS

PCT International Search Report and Written Opinion issued in International Application No. PCT/CN2020/098784 on Sep. 8, 2020, 15 pages (with English translation).

* cited by examiner

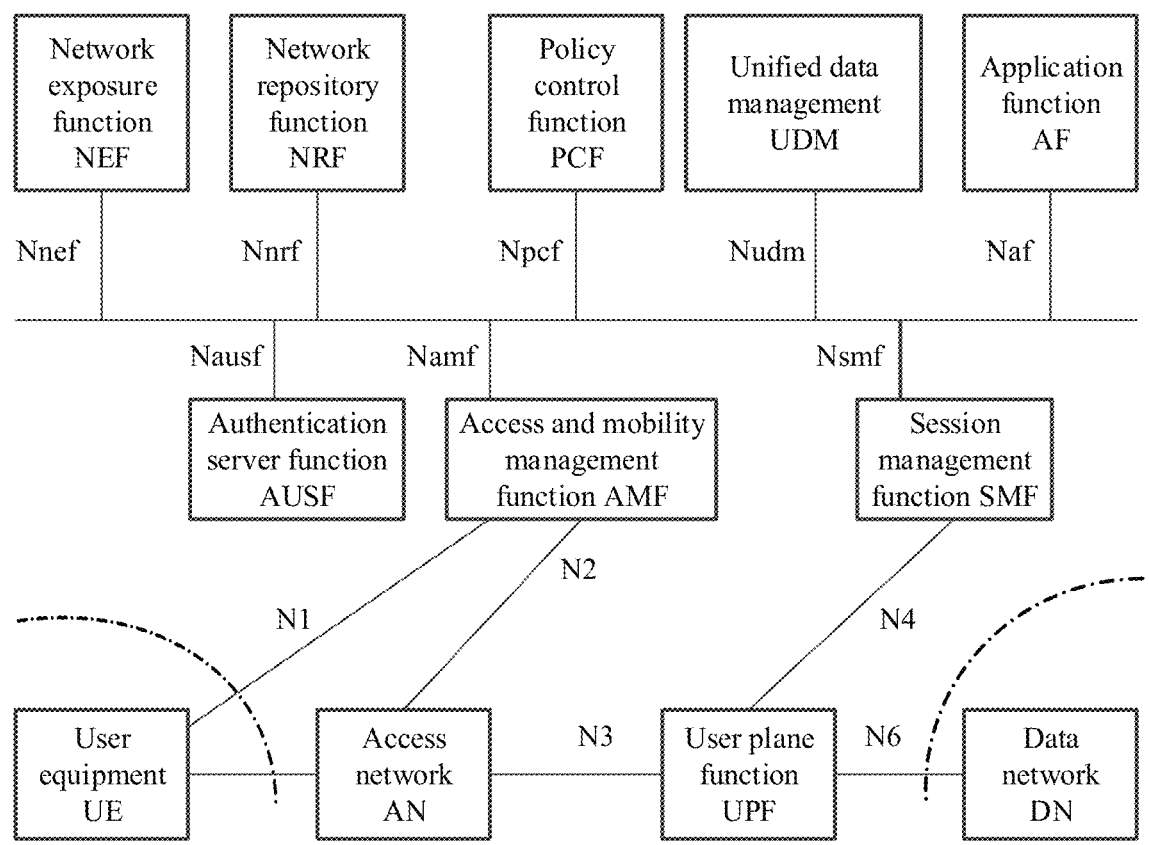
FIG. 1-A

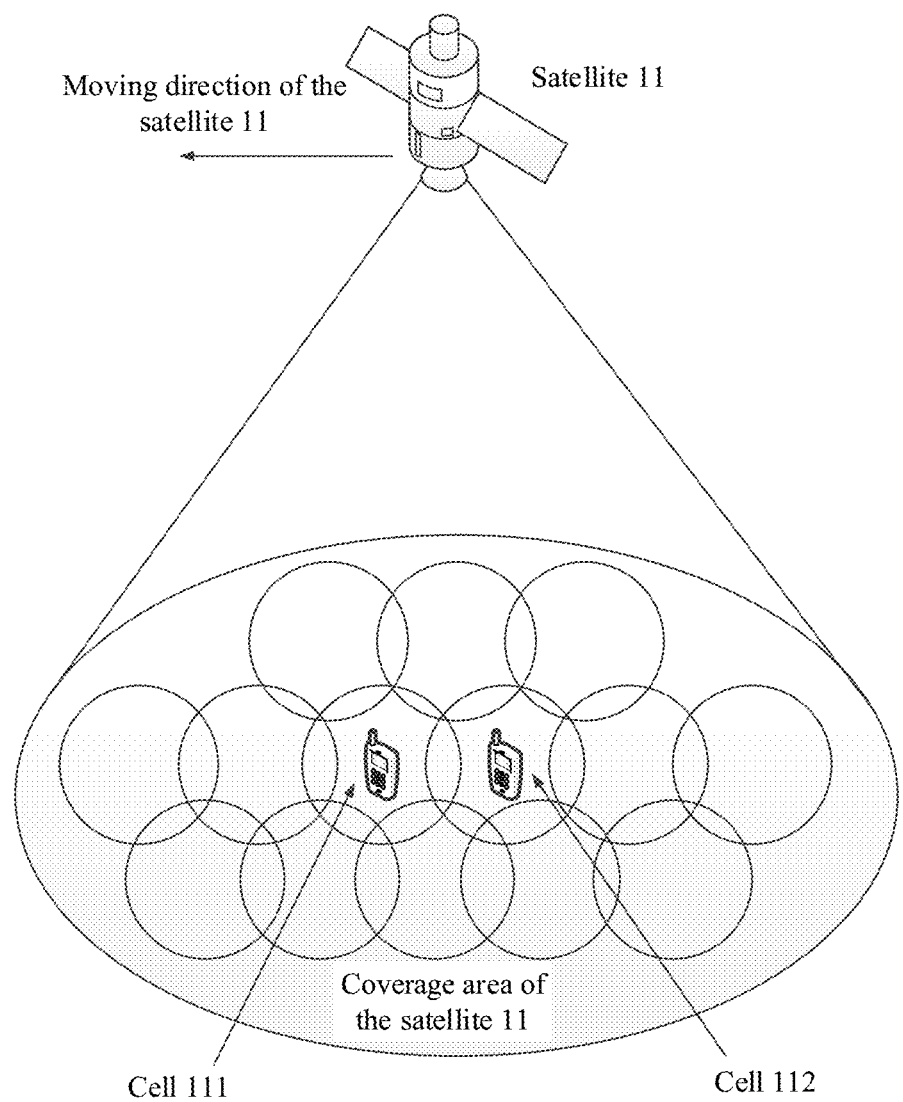
FIG. 1-B

| Scenario | | Measurement mechanism | Cell reselection criterion |
| --- | --- | --- | --- |
| Intra-frequency cell | | S < S_intrasearch, measurement is enabled; or S > S_intrasearch, measurement may be disabled | Meet an R criterion within TreselectionRAT |
| Inter-frequency cell | Higher priority | Perform constant measurement | An S value of a high-priority cell is greater than a preset threshold within TreselectionRAT |
| | Equal priority | S < S_nonintrasearch, measurement is enabled; or S > S_intrasearch, measurement may be disabled | Meet the R criterion within TreselectionRAT |
| | Lower priority | S < S_nonintrasearch, measurement is enabled; or S > S_intrasearch, measurement may be disabled | An S value of a serving cell is less than the preset threshold and an S value of a low-priority cell is greater than the preset threshold within TreselectionRAT. |

FIG. 1-C

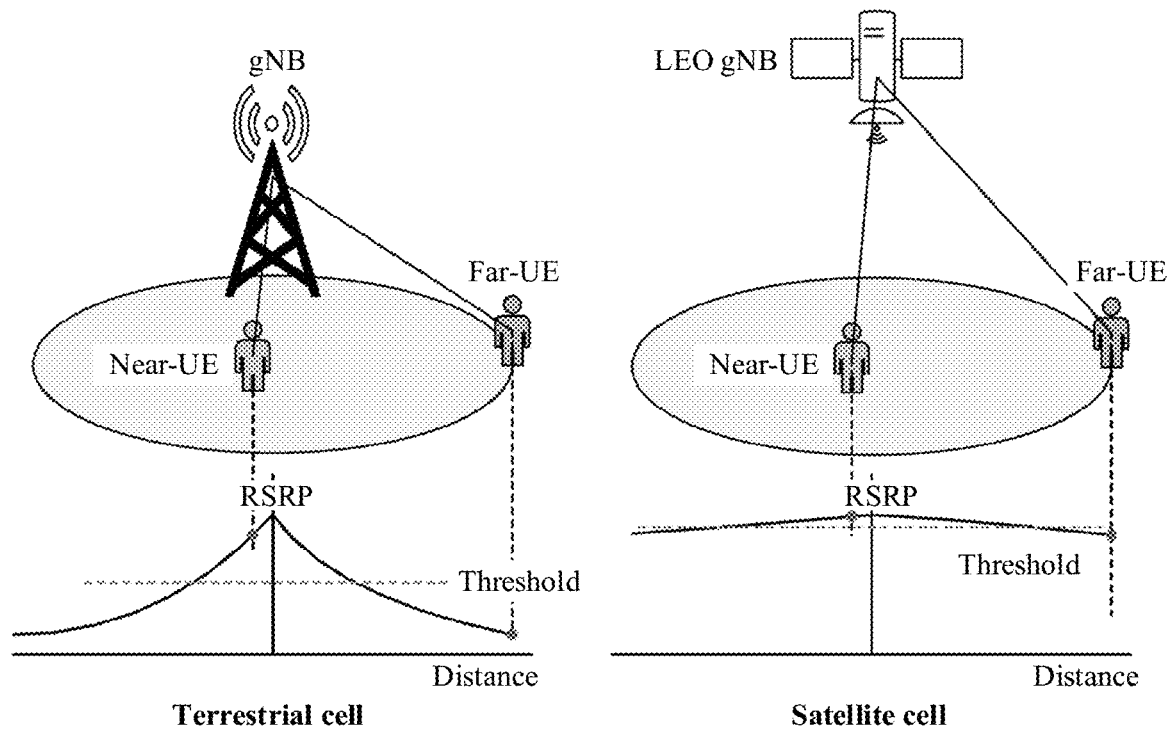
FIG. 1-D
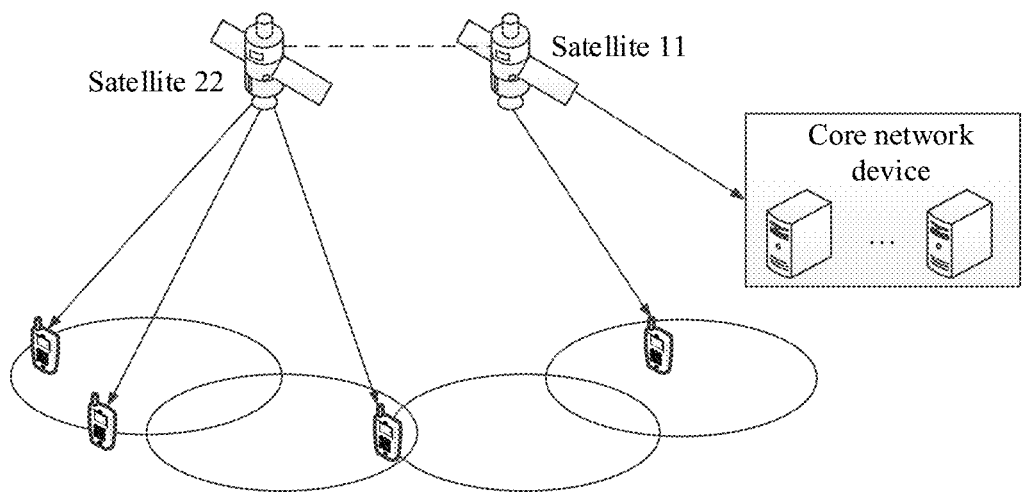
FIG. 2

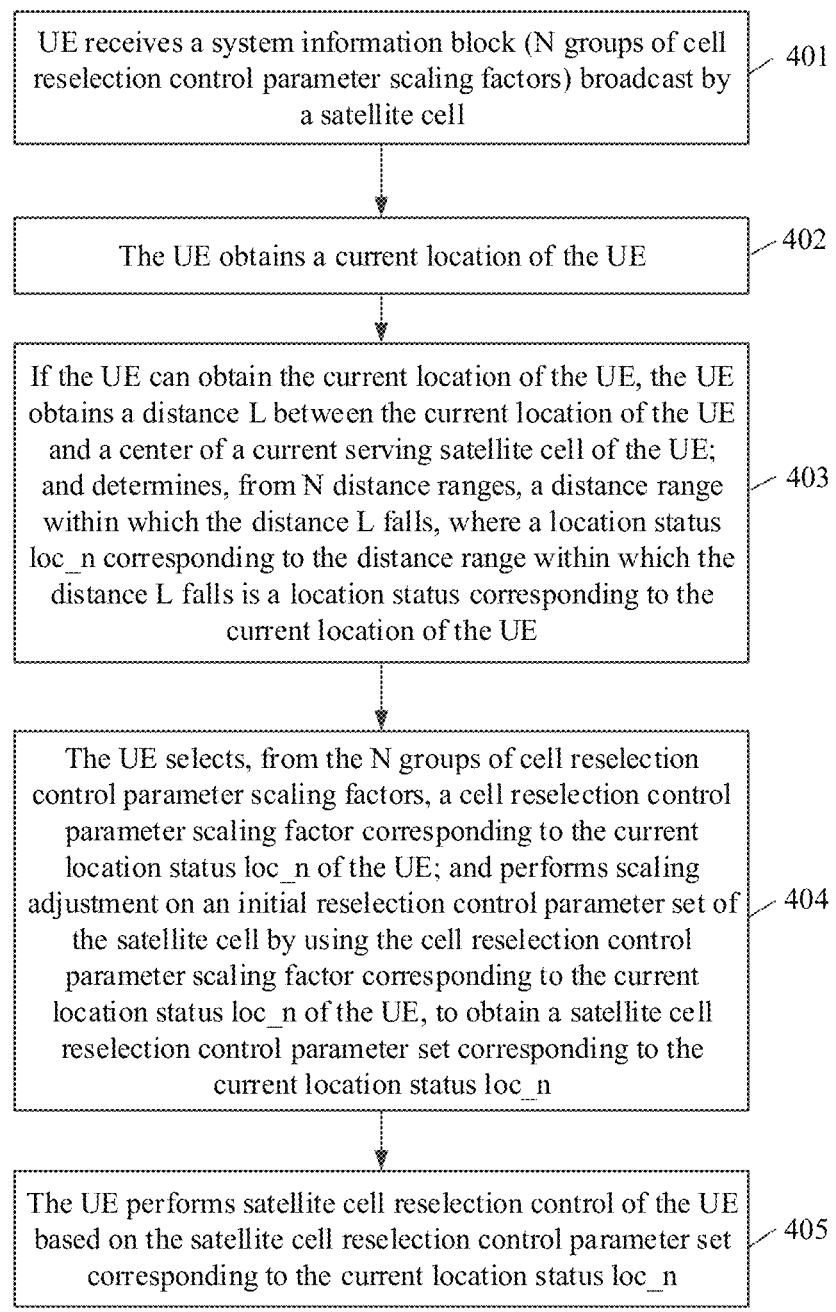
FIG. 4-A

| Loc-MeasConfig information element |
|---|
| -- ASN1START<br>-- TAG-MEAS-CONFIG-START<br>Loc-MeasureConfig : : =    Sequence {<br>  S_intrasearch_ls_n<br>  S_nonintrasearch_ls_n<br>  Qhyst_ls_n<br>  TreselectionRAT _ls_n<br>  }<br>-- TAG-MEAS-CONFIG-STOP<br>-- ASN1STOP |

FIG. 4-B

| Loc-MeasConfig information element | |
|---|---|
| S_intrasearch_ls_n | Intra-frequency measurement threshold scaling factor corresponding to a location status loc_n |
| S_nonintrasearch_ls_n | Inter-frequency/Inter-system measurement threshold scaling factor corresponding to the location status loc_n |
| Qhyst_ls_n | Serving cell hysteresis value scaling factor corresponding to the location status loc_n |
| TreselectionRAT _ls_n | Trigger time scaling factor corresponding to the location status loc_n |

FIG. 4-C

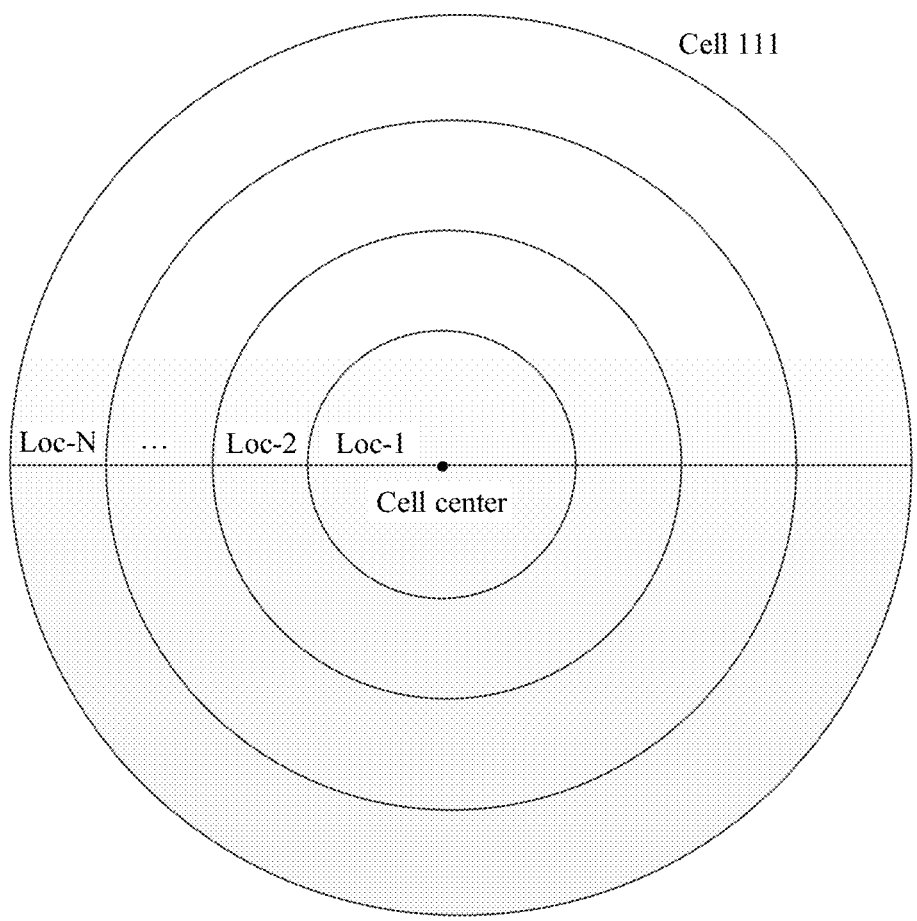
FIG. 4-D

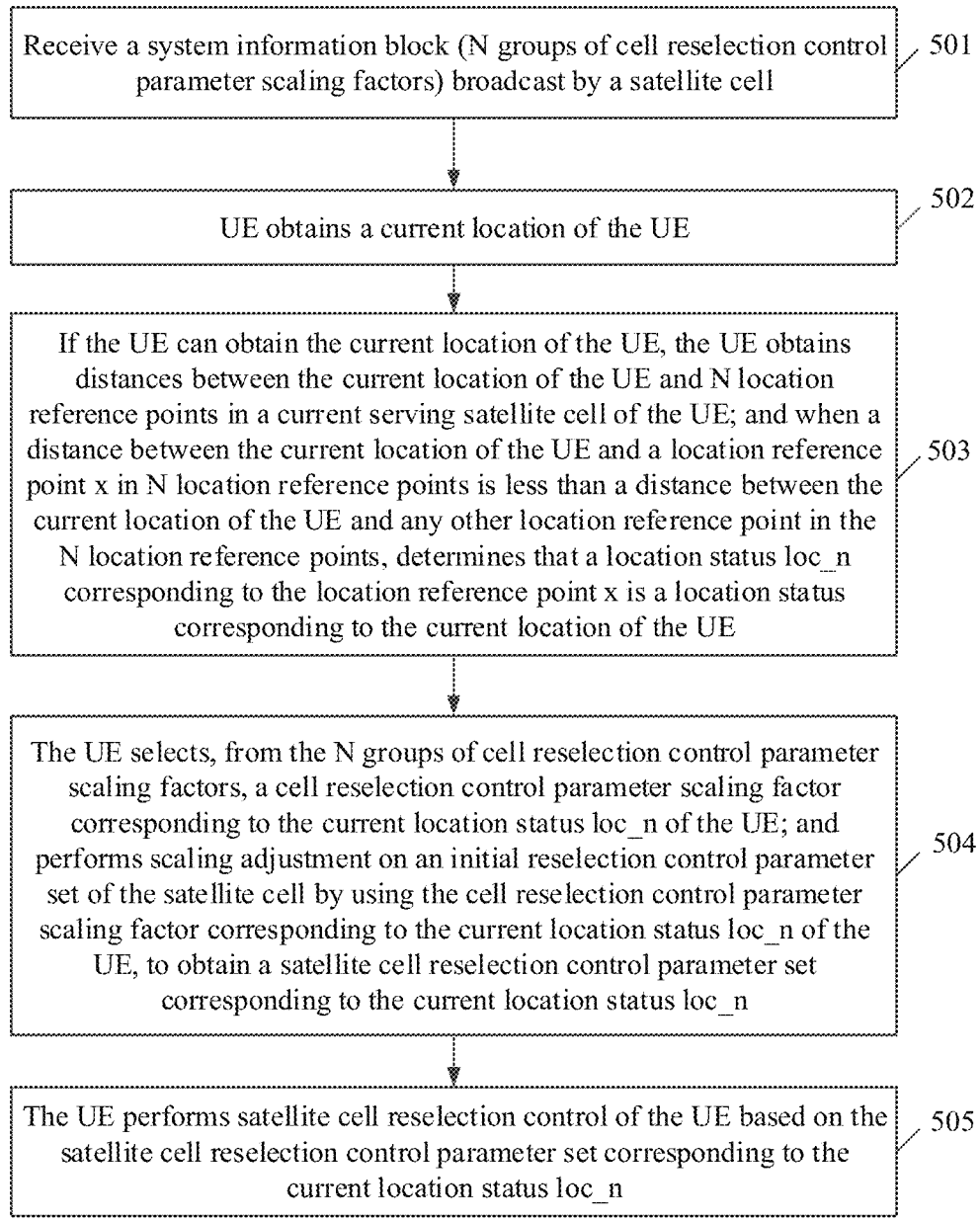
FIG. 5-A

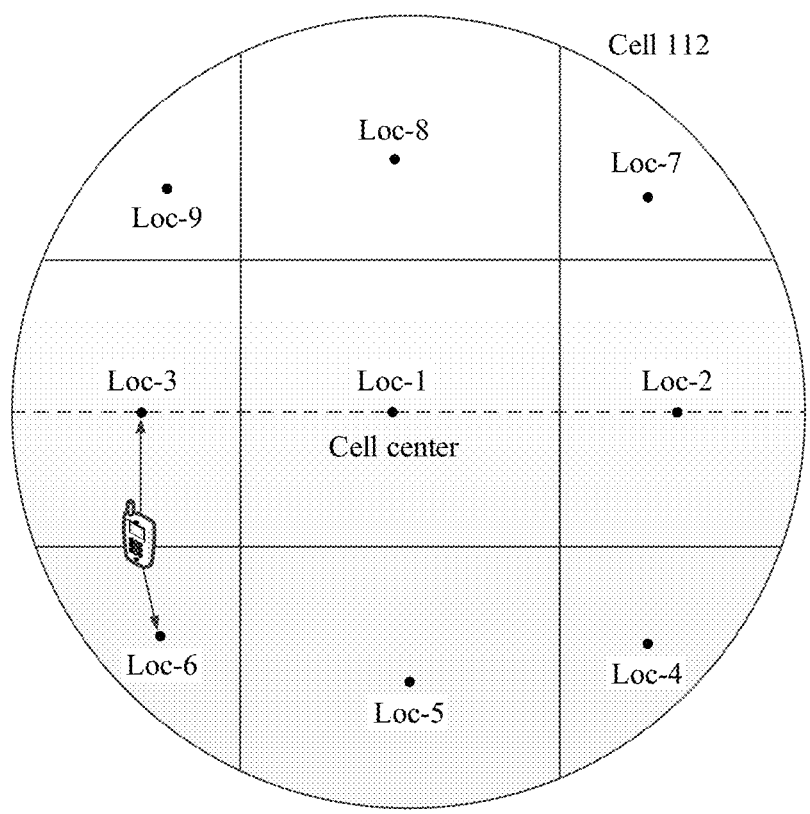
FIG. 5-B

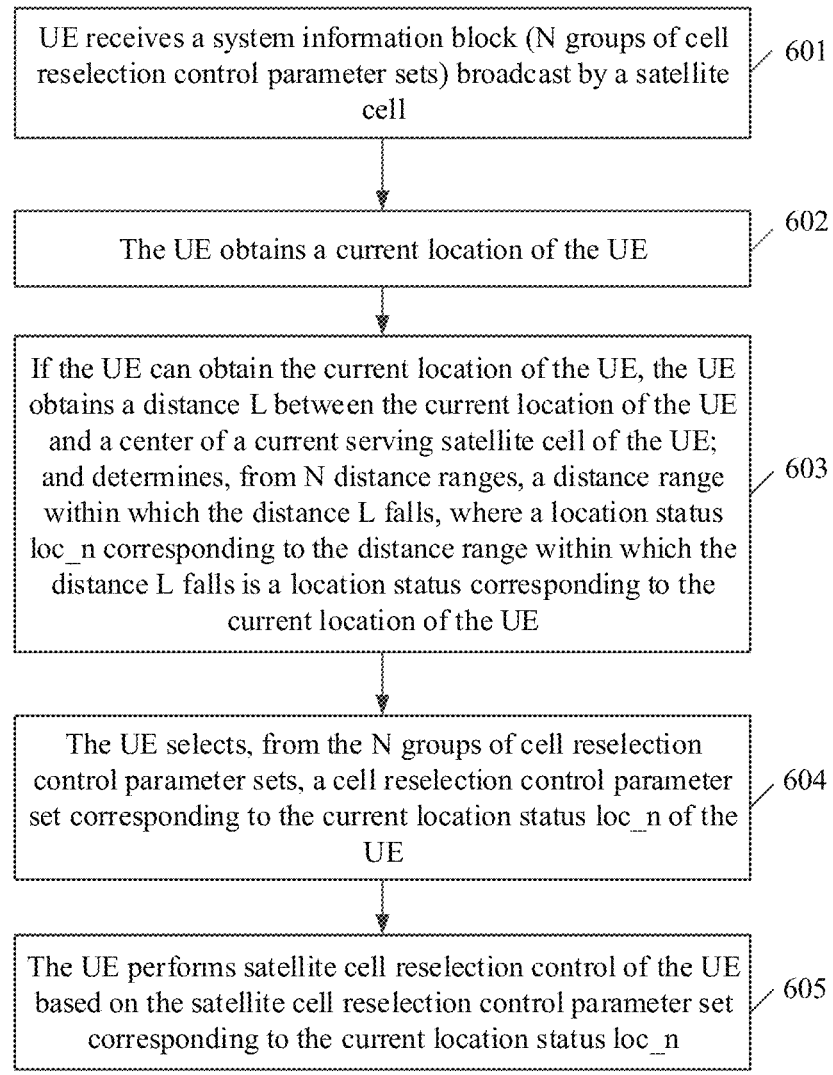
FIG. 6-A

| Loc-MeasConfig information element |
|---|
| -- ASN1START<br>-- TAG-MEAS-CONFIG-START<br>Loc-MeasureConfig : : =   Sequence {<br>  S_intrasearch_n<br>  S_nonintrasearch_n<br>Qhyst_n<br>TreselectionRAT_n<br>    }<br>-- TAG-MEAS-CONFIG-STOP<br>-- ASN1STOP |

FIG. 6-B

| Loc-MeasConfig information element | |
|---|---|
| S_intrasearch_n | Intra-frequency measurement threshold corresponding to a location status loc_n |
| S_nonintrasearch_n | Inter-frequency/Inter-system measurement threshold corresponding to the location status loc_n |
| Qhyst_n | Serving cell hysteresis value corresponding to the location status loc_n |
| TreselectionRAT_n | Trigger time corresponding to the location status loc_n |

FIG. 6-C

SATELLITE CELL RESELECTION CONTROL METHOD AND RELATED DEVICE

CROSS-REFERENCE TO RELATED APPLICATIONS

This application is a continuation of International Application No. PCT/CN2020/098784, filed on Jun. 29, 2020, which claims priority to Chinese Patent Application No. 201910581558.6, filed on Jun. 29, 2019. The disclosures of the aforementioned applications are hereby incorporated by reference in their entireties.

TECHNICAL FIELD

This application relates to the field of communication technologies, and in particular, to a satellite cell reselection control method, user equipment, and a computer-readable storage medium.

BACKGROUND

Because of remarkable advantages of global coverage, long-distance transmission, flexible networking, easy deployment and being free from geographical conditions, satellite communication has been widely applied to a plurality of fields, such as maritime communication, positioning and navigation, disaster relief, scientific experiments, video broadcasting, and earth observation.

A terrestrial 5th generation mobile network (5G) has a complete industry chain, a large user group, a flexible and efficient application service model, and the like. Therefore, integrating a satellite communication system and the 5G network while complementing strength of each other to form a global seamless integrated communication network of sea, land, space, and air to meet a plurality of ubiquitous service requirements of users is an important direction of communication development in the future.

The satellite communication system uses a non-geostationary earth orbit (NGEO) satellite. Because the NGEO satellite moves at a high speed, user equipment (UE) in an idle state or a deactivated state needs to frequently perform reselection from different satellite cells. A cell reselection mechanism is used to ensure, to a greatest extent, that the UE camps on a proper satellite cell.

The inventor of this application finds, through a large quantity of tests and practice, that based on a conventional satellite inter-cell reselection mechanism (where the conventional satellite inter-cell reselection mechanism is basically the same as an inter-cell reselection mechanism of the 5G network), the UE can hardly camp on a proper satellite cell in many cases.

SUMMARY

Embodiments of this application provide a satellite cell reselection control method, user equipment, and a computer-readable storage medium.

A first aspect of this application provides a satellite cell reselection control method, and the method may include: User equipment determines a current location status of the user equipment. The user equipment obtains a satellite cell reselection control parameter set corresponding to the current location status. The user equipment performs satellite cell reselection control of the user equipment based on the obtained satellite cell reselection control parameter set.

The satellite cell reselection control parameter set may include, for example, one or more of the following satellite cell reselection control parameters: an intra-frequency measurement threshold (which may be represented as S_intrasearch), a serving cell hysteresis value (which may be represented as Qhyst), an inter-frequency/inter-system measurement threshold (which may be represented as S_nonintrasearch), and a cell reselection timer value (which may be represented as TreselectionRAT).

It can be learned that, in the foregoing example solutions, because different satellite cell reselection control parameter sets may be designed for different current location statuses, performing satellite cell reselection control of the UE by the UE based on the satellite cell reselection control parameter set corresponding to the current location status enables the currently used satellite cell reselection control parameter set to be better matched with the current location of the UE. Compared with a conventional mechanism of making a satellite cell reselection decision only based on signal quality strength or reference signal received quality measured by the UE, the foregoing example solutions improve a probability that the UE camps on a proper satellite cell.

In some possible implementations, the method may further include: The user equipment receives a system information block broadcast by a satellite cell, where the system information block includes N groups of cell reselection control parameter scaling factors, and the N groups of cell reselection control parameter scaling factors are in a one-to-one correspondence with N location statuses. The obtaining a satellite cell reselection control parameter set corresponding to the current location status includes: selecting, from the N groups of cell reselection control parameter scaling factors, a cell reselection control parameter scaling factor corresponding to the current location status of the user equipment; and performing scaling adjustment on an initial reselection control parameter set of the satellite cell by using the cell reselection control parameter scaling factor corresponding to the current location status of the user equipment, to obtain the satellite cell reselection control parameter set corresponding to the current location status.

For example, the cell reselection control parameter scaling factor is used to perform scaling adjustment on one or more of the following cell reselection control parameters: S_intrasearch, Qhyst, S_nonintrasearch, and TreselectionRAT.

For example, let S_intrasearch=S_intrasearch−4.

For another example, let TreselectionRAT=TreselectionRAT*0.25.

In other possible implementations, the method may further include: The user equipment receives a system information block broadcast by a satellite cell, where the system information block includes N groups of cell reselection control parameter sets, and the N groups of cell reselection control parameter sets are in a one-to-one correspondence with N location statuses; and the obtaining a satellite cell reselection control parameter set corresponding to the current location status includes: selecting, from the N groups of cell reselection control parameter sets, the cell reselection control parameter set corresponding to the current location status.

In some possible implementations, that user equipment determines a current location status of the user equipment may include: The user equipment obtains a current location of the user equipment; and determines a location status corresponding to the obtained current location of the user equipment, where the determined location status is the current location status of the user.

The user equipment may obtain the current location of the user equipment through GNSS measurement, a single-satellite or multi-satellite positioning technology, calculation of an ephemeris message broadcast by a cell, or the like.

In some possible implementations, the determining a location status corresponding to the obtained current location of the user equipment may include: obtaining a distance L between the current location of the user equipment and a center of the current serving satellite cell of the user equipment; and determining, from N distance ranges, a distance range within which the distance L falls, where a location status corresponding to the distance range within which the distance L falls is the location status corresponding to the current location of the user equipment, and N is an integer greater than 1.

For example, widths of different distance ranges may be the same or similar, or may be completely different. Widths of different distance ranges may be alternatively set based on a requirement.

In some possible implementations, the determining a location status corresponding to the obtained current location of the user equipment includes: obtaining distances between the current location of the user equipment and N location reference points in the current serving satellite cell of the user equipment; and when a distance between the current location of the user equipment and a location reference point x in the N location reference points is less than a distance between the current location of the user equipment and any other location reference point in the N location reference points, determining that a location status corresponding to the location reference point x is the location status corresponding to the current location of the user equipment, where N is an integer greater than 1.

For example, the location reference points may be evenly or approximately evenly distributed in the cell, or distribution of the location reference points may be set based on a requirement.

A second aspect of this application provides a device (for example, user equipment (UE)), including:

a determining unit, configured to determine a current location status of the device;

an obtaining unit, configured to obtain a satellite cell reselection control parameter set corresponding to the current location status; and a reselection control unit, configured to perform satellite cell reselection control of the user equipment based on the obtained satellite cell reselection control parameter set.

In some possible implementations, the determining unit is specifically configured to: obtain a current location of the device; and determine a location status corresponding to the obtained current location of the device, where the determined location status is the current location status of the user equipment.

In some possible implementations, that the determining unit determines a location status corresponding to the obtained current location of the device includes:

obtaining a distance L between the current location of the device and a center of a current serving satellite cell of the user equipment; and determining, from N distance ranges, a distance range within which the distance L falls, where a location status corresponding to the distance range within which the distance L falls is the location status corresponding to the current location of the device, and N is an integer greater than 1.

In some possible implementations, that the determining unit determines a location status corresponding to the obtained current location of the device includes: obtaining distances between the current location of the device and N location reference points in a current serving satellite cell of the user equipment; and when a distance between the current location of the device and a location reference point x in the N location reference points is less than a distance between the current location of the device and any other location reference point in the N location reference points, determining that a location status corresponding to the location reference point x is the location status corresponding to the current location of the device, where N is an integer greater than 1.

In some possible implementations, the user equipment further includes a receiving unit, configured to receive a system information block broadcast by the satellite cell, where the system information block includes N groups of cell reselection control parameter scaling factors, and the N groups of cell reselection control parameter scaling factors are in a one-to-one correspondence with N location statuses; and the obtaining unit is specifically configured to: select, from the N groups of cell reselection control parameter scaling factors, a cell reselection control parameter scaling factor corresponding to the current location status of the device; and perform scaling adjustment on an initial reselection control parameter set of the satellite cell by using the cell reselection control parameter scaling factor corresponding to the current location status of the device, to obtain the satellite cell reselection control parameter set corresponding to the current location status.

In some possible implementations, for example, the cell reselection control parameter scaling factor may be used to perform scaling adjustment on one or more of the following cell reselection control parameters: S_intrasearch, Qhyst, S_nonintrasearch, and TreselectionRAT.

In some possible implementations, the user equipment further includes a receiving unit, configured to receive a system information block broadcast by the satellite cell, where the system information block includes N groups of cell reselection control parameter sets, and the N groups of cell reselection control parameter sets are in a one-to-one correspondence with N location statuses.

The obtaining unit is specifically configured to select, from the N groups of cell reselection control parameter sets, the cell reselection control parameter set corresponding to the current location status.

According to a third aspect, an embodiment of this application further provides a device (for example, user equipment (UE)), including:

a processor and a memory that are coupled to each other, where the processor is configured to invoke a computer program stored in the memory to perform some or all of the steps of the methods in the foregoing aspects.

According to a fourth aspect, an embodiment of this application further provides a computer-readable storage medium, where the computer-readable storage medium stores a computer program, and the computer program is performed by a processor to complete some or all of the steps of the methods in the foregoing aspects.

According to a fifth aspect, an embodiment of this application further provides a computer program product including instructions. When the computer program product is run on user equipment, the user equipment performs some or all of the steps of the methods in the foregoing aspects.

According to a sixth aspect, an embodiment of this application further provides a communication apparatus, including at least one input end, a signal processor, and at least one output end, where the signal processor is configured to perform some or all steps of any method in the foregoing aspects.

BRIEF DESCRIPTION OF DRAWINGS

The following describes some accompanying drawings in embodiments of this application.

FIG. 1-A is a schematic diagram of an architecture of communication system according to an embodiment of this application;

FIG. 1-B is a schematic diagram of an example of a scenario in which UE performs reselection from satellite cells according to an embodiment of this application;

FIG. 1-C is a schematic diagram of an example of conditions of intra-frequency cell reselection and inter-frequency/inter-system cell reselection according to an embodiment of this application;

FIG. 1-D is a schematic diagram of an example of far-near effect comparison between a terrestrial cell and a satellite cell according to an embodiment of this application;

FIG. 2 is a schematic diagram of an architecture of another communication system according to an embodiment of this application;

FIG. 4-A is a schematic flowchart of another satellite cell reselection control method according to an embodiment of this application;

FIG. 4-B is a schematic diagram of an example of a format of a newly added information element of a system information block according to an embodiment of this application;

FIG. 4-C is a schematic diagram of an example of meanings of parameters in a newly added information element according to an embodiment of this application;

FIG. 4-D is a schematic diagram of an example of location status division according to an embodiment of this application;

FIG. 5-A is a schematic flowchart of another satellite cell reselection control method according to an embodiment of this application;

FIG. 5-B is a schematic diagram of another example of location status division according to an embodiment of this application;

FIG. 6-A is a schematic flowchart of another satellite cell reselection control method according to an embodiment of this application;

FIG. 6-B is a schematic diagram of an example of a format of a newly added information element of another system information block according to an embodiment of this application;

FIG. 6-C is a schematic diagram of an example of meanings of parameters in another newly added information element according to an embodiment of this application;

DESCRIPTION OF EMBODIMENTS

Figure 3:
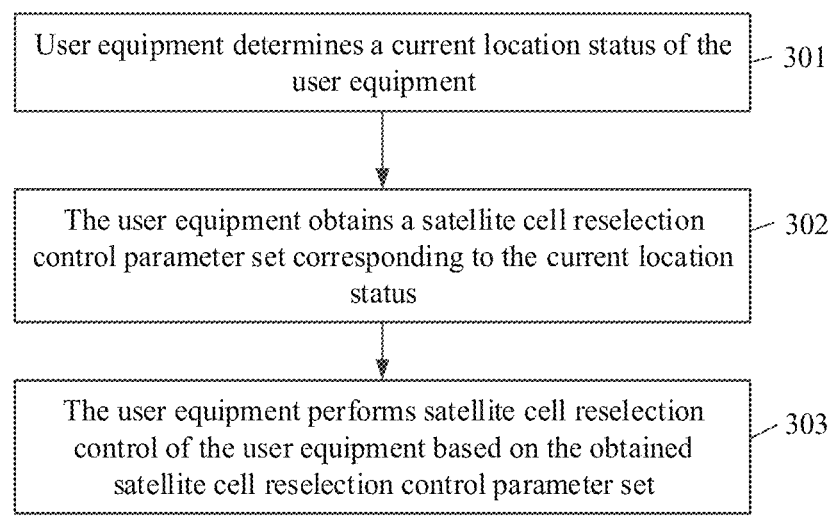
FIG. 3 is a schematic flowchart of a satellite cell reselection control method according to an embodiment of this application.

The following describes embodiments of this application with reference to accompanying drawings in the embodiments of this application.

FIG. 1-A is a schematic diagram of an example of a 5G network architecture according to an embodiment of this application. In a 5G network, some function network elements (for example, a mobility management entity (MME)) in a 4G network are split, and a service-based architecture is defined. In the network architecture shown in FIG. 1-A, a function similar to that of an MME in the 4G network is split into an access and mobility management function (AMF), a session management function (SMF), and the like.

The following describes some other related network elements/entities.

A user equipment (UE) accesses a data network (DN) or the like by accessing an operator network, and uses a service provided by an operator or a third party on the DN.

An access and mobility management function (AMF) is a control-plane network element in a 3GPP network, and is mainly responsible for access control and mobility management when the UE accesses an operator network. A security anchor function (SEAF) may be deployed on the AMF, or deployed on a device other than the AMF. FIG. 1-A is an example in which the SEAF is deployed on the AMF. When the SEAF is deployed in the AMF, the SEAF and the AMF may be jointly referred to as an AMF.

A session management function (SMF) is a control-plane network element in the 3GPP network. The SMF is mainly responsible for managing packet data unit (PDU) sessions of the UE. A PDU session is a channel used to transmit a PDU, and the UE and the DN may send a PDU to each other by using a PDU session. The SMF is responsible for management tasks such as establishment, maintenance, and deletion of the PDU session.

The data network (DN), also referred to as a packet data network (PDN), is a network located outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of the UE, and a control server of the sensor is deployed in the DN. The UE communicates with the control server. After obtaining an instruction from the control server, the UE may transfer collected data to the control server according to the instruction. For another example, a DN is an internal office network of a company, a terminal used by an employee of the company may play a role of UE, and the UE may access internal information and other resources of the company.

A unified data management network element (UDM) is also a control-plane network element in the 3GPP network. The UDM is mainly responsible for storing subscription data, credentials, subscriber permanent identifiers (SUPIs), and the like of subscribers (UE) in the 3GPP network. The data may be used for authentication and authorization when the UE accesses a 3GPP network of an operator.

An authentication server function (AUSF) is also a control-plane network element in the 3GPP network. The AUSF is mainly used for first-level authentication (namely, subscriber authentication in the 3GPP network).

A network exposure function (NEF) is also a control-plane network element in the 3GPP network. The NEF is mainly responsible for exhibiting external interfaces of the 3GPP network to third parties in a secure manner. When a network element, for example, the SMF, needs to communicate with a third party network element, the NEF may serve as a relay for communication. The NEF can translate internal and external identifiers when serving as the relay. For example, when sending an SUPI of the UE from the 3GPP network to a third party, the NEF may translate the SUPI into a corresponding external identity (ID). Conversely, when sending an external identity ID to the 3GPP network, the NEF may translate the external identity ID into a corresponding SUPI.

A network repository function (NRF) is also a control-plane network element in the 3GPP network. The NR is mainly responsible for storing configuration service profiles of accessible network functions (NFs), and providing network function discovery services for other network elements.

A user plane function (UPF) is a gateway for communication between the 3GPP network and the DN.

A policy control function (PCF) is a control-plane function in the 3GPP network, and is configured to provide a policy of a PDU session for the SMF. The policy may include charging, quality of service (QoS), an authorization-related policy, and the like.

An access network (AN) is a sub-network of the 3GPP network. To access the 3GPP network, the UE needs to first access the AN. In a radio access scenario, the AN is also referred to as a radio access network (RAN). Therefore, terms "RAN" and "AN" are usually used interchangeably.

The 3GPP network is a network that complies with 3GPP specifications. In FIG. 1-A, parts other than the UE and the DN may be considered as the 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, N6, and the like in the architecture shown in FIG. 1-A represent reference points between related network elements/network functions. Nausf, Namf, and the like represent service-oriented interfaces of related network functions.

Certainly, the 3GPP network and a non-3GPP network may coexist, and some network elements in the 5G network may also be used in some non-5G networks.

Future terrestrial 5G has a complete industry chain, a large user group, a flexible and efficient application service model, and the like. Therefore, integrating a satellite communication system and the 5G network while complementing strength of each other to form a global seamless integrated communication network of sea, land, space, and air to meet a plurality of ubiquitous service requirements of users is an important direction of communication development in the future.

FIG. 1-B shows an example of a scenario in which UE performs reselection from satellite cells. In the example shown in FIG. 1-B, a satellite 11 moves from the right to the left at a high speed, and the UE needs to frequently perform cell reselection, for example, from a satellite cell 111 to a satellite cell 112. A proper cell reselection mechanism is used to ensure, to a greatest extent, that the UE camps on a proper satellite cell.

The following briefly describes a cell reselection mechanism of the 5G network. In the cell reselection mechanism of the 5G network, a decision is mainly made based on signal quality strength (for example, reference signal received power (RSRP)) or reference signal received quality (RSRQ) measured by the UE.

For example, as illustrated in FIG. 1-C, cell reselection scenarios of the 5G network may include intra-frequency cell reselection and inter-frequency/inter-system cell reselection.

During intra-frequency cell reselection, when an S value of a serving cell is greater than a given threshold S_intrasearch (intra-frequency measurement threshold), intra-frequency measurement needs to be enabled. Otherwise, the UE may choose to disable measurement. In an actual network, to reduce energy consumption, the UE usually disables measurement when S>S_intrasearch. After obtaining a measurement result, the UE sorts candidate cells based on an R criterion, and selects an optimal cell for camp-on.

The R criterion is as follows:

$$Rs = Q_{meas,s} + Qhyst - Qoffsettemp; \text{ and}$$

$$Rn = Q_{meas,n} - Qoffset - Qoffsettemp, \text{ where}$$

Qmeas,s represents a measured RSRP value of a serving cell, Qmeas,n represents a measured RSRP value of a neighboring cell, Qhyst represents a hysteresis value of the serving cell, and Qoffset and Qoffsettemp represent quality offsets of the neighboring cell.

During inter-frequency/inter-system cell reselection, differentiation needs to be performed based on priorities. For a higher-priority cell, the UE needs to constantly perform measurement, and reselect the higher-priority cell when an S value of the higher-priority cell is greater than a corresponding threshold. For an equal-priority cell or a lower-priority cell, when an S value of a serving cell is greater than the given threshold S_nonintrasearch (inter-frequency/inter-system measurement threshold), the UE needs to enable intra-frequency measurement. Otherwise, the UE may choose to disable measurement.

FIG. 1-D is a schematic diagram of far-near effect comparison between a terrestrial cell and a satellite cell.

In the terrestrial 5G network, because a difference of RSRP or RSRQ between center UE and edge UE of a cell is obvious, and usually, may be up to tens of dB, the network may approximately determine, based on a measured RSRP or RSRQ value received by the UE, whether the UE moves to a cell edge, and perform cell reselection. However, as shown in FIG. 1-C, in an NGEO satellite scenario, because a satellite is relatively high and a far-near effect is not obvious, a signal strength difference between users in a cell center and on a cell edge is not large (a maximum difference is usually approximately 3 dB), and therefore, a location of the UE relative to the cell center cannot be accurately determined based on a measured RSRP or RSRQ value. An intra-frequency measurement threshold S_intrasearch is used as an example. When S_intrasearch is set to be relatively high, S<S_intrasearch holds, and the UE constantly performs measurement. Under a typical low signal-to-noise ratio condition of a satellite, power consumption is usually large. However, when S_intrasearch is set to be relatively low, S>S_intrasearch holds, and the UE usually does not select measurement. Consequently, reselection still does not occur when the UE crosses a cell boundary. Therefore, the UE may not be able to camp on an optimal cell in a timely manner, increasing a probability of a paging failure. To sum up, validity of a conventional measurement event based on signal strength is limited, and therefore, the UE cannot perform timely reselection in a satellite communication scenario and cannot camp on a suitable/optimal cell.

To resolve the foregoing problems existing in a conventional cell reselection technology in satellite communication, this application provides some location assistance-based satellite cell reselection mechanisms to dynamically adjust measurement parameters of UE at different locations during cell reselection, to ensure validity of cell reselection.

An application scenario and a system framework involved in the embodiments of this application may be a mobile satellite communication system illustrated in FIG. 2. A satellite may provide a communication service to a mobile station. The satellite in the embodiments of this application is an NGEO satellite, and the satellite is connected to a core network device. The mobile station in the embodiments of this application may include various handheld devices, in-vehicle devices, wearable devices, or computing devices that have a wireless communication function, or other processing devices connected to a wireless modem. Specifically, for example, the mobile station may be a subscriber unit, a cellular phone, a smartphone, a wireless data card, a personal digital assistant computer, a tablet computer, a wireless modem, a laptop computer, or a machine type communication terminal. For ease of unified description, in descriptions of the embodiments of this application, mobile stations are collectively referred to as UE.

The following specifically describes a satellite cell reselection control method provided in the embodiments of this application.

FIG. 3 is a schematic flowchart of a satellite cell reselection control method according to an embodiment of this application. The satellite cell reselection control method may include the following steps.

301. User equipment determines a current location status of the user equipment.

302. The user equipment obtains a satellite cell reselection control parameter set corresponding to the current location status.

The satellite cell reselection control parameter set may include, for example, one or more of the following satellite cell reselection control parameters: an intra-frequency measurement threshold (which may be represented as S_intrasearch), a serving cell hysteresis value (which may be represented as Qhyst), an inter-frequency/inter-system measurement threshold (which may be represented as S_nonintrasearch), and a cell reselection timer value (which may be represented as TreselectionRAT).

303. The user equipment performs satellite cell reselection control of the user equipment based on the obtained satellite cell reselection control parameter set.

For example, that user equipment determines a current location status of the user equipment includes: The user equipment obtains a current location of the user equipment; and determines a location status corresponding to the obtained current location of the user equipment, where the determined location status is the current location status of the user equipment.

The user equipment may obtain the current location of the user equipment through GNSS measurement, a single-satellite or multi-satellite positioning technology, calculation of an ephemeris message broadcast by a cell, or the like.

For a manner of using the satellite cell reselection control parameter set corresponding to the current location status, refer to an R criterion and the mechanism illustrated in FIG. 1-C.

It can be learned that, the foregoing example provides a location assistance-based satellite cell reselection mechanism. Because different satellite cell reselection control parameter sets may be designed for different current location statuses, performing satellite cell reselection control of the UE by the UE based on the satellite cell reselection control parameter set corresponding to the current location status enables the currently used satellite cell reselection control parameter set to be better matched with the current location of the UE. It is found through practice that, compared with a conventional mechanism of making a satellite cell reselection decision only based on signal quality strength or reference signal received quality measured by the UE, the foregoing example solutions improve a probability that the UE camps on a proper satellite cell.

A plurality of location statuses may be designed based on a requirement, and different location statuses may correspond to different satellite cell reselection control parameter sets. For example, in a cell center, a related measurement threshold is high and a trigger time is long; however, on a cell edge, a measurement threshold is low and a trigger time is short.

The location status corresponding to the obtained current location of the user equipment may be determined in various manners.

For example, the determining a location status corresponding to the obtained current location of the user equipment includes: obtaining a distance L between the current location of the user equipment and a center of a current serving satellite cell of the user equipment; and determining, from N distance ranges, a distance range within which the distance L falls, where a location status corresponding to the distance range within which the distance L falls is the location status corresponding to the current location of the user equipment, and N is an integer greater than 1.

For another example, the determining a location status corresponding to the obtained current location of the user equipment includes: obtaining distances between the current location of the user equipment and N location reference points in a current serving satellite cell of the user equipment; and when a distance between the current location of the user equipment and a location reference point x in the N location reference points is less than a distance between the current location of the user equipment and any other location reference point in the N location reference points, determining that a location status corresponding to the location reference point x is the location status corresponding to the current location of the user equipment, where N is an integer greater than 1.

Further, the satellite cell may notify, by broadcasting a system information block (SIB) or in another manner, the UE of satellite cell reselection control parameter sets corresponding to different location statuses.

For example, the method further includes: The user equipment receives a system information block broadcast by the satellite cell, where the system information block includes N groups of cell reselection control parameter scaling factors, and the N groups of cell reselection control parameter scaling factors are in a one-to-one correspondence with N location statuses.

The obtaining a satellite cell reselection control parameter set corresponding to the current location status may include: selecting, from the N groups of cell reselection control parameter scaling factors, a cell reselection control parameter scaling factor corresponding to the current location status of the user equipment; and performing scaling adjustment on an initial reselection control parameter set of the satellite cell by using the cell reselection control parameter scaling factor corresponding to the current location status of the user equipment, to obtain the satellite cell reselection control parameter set corresponding to the current location status.

The cell reselection control parameter scaling factor may be used to perform scaling adjustment on one or more of the following cell reselection control parameters: S_intrasearch, S_nonintrasearch, Qhyst, and TreselectionRAT.

For another example, the method further includes: The user equipment receives a system information block broadcast by the satellite cell, where the system information block includes N groups of cell reselection control parameter sets, and the N groups of cell reselection control parameter sets are in a one-to-one correspondence with N location statuses.

The obtaining a satellite cell reselection control parameter set corresponding to the current location status includes: selecting, from the N groups of cell reselection control parameter sets, the cell reselection control parameter set corresponding to the current location status.

It should be understood that the satellite cell may alternatively notify, in another manner, the UE of satellite cell reselection control parameter sets corresponding to different location statuses.

FIG. 4-A is a schematic flowchart of another satellite cell reselection control method according to an embodiment of this application. The another satellite cell reselection control method may include the following steps.

401. UE receives a system information block broadcast by a satellite cell.

The system information block includes N groups of cell reselection control parameter scaling factors, and the N groups of cell reselection control parameter scaling factors are in a one-to-one correspondence with N location statuses.

A format of a newly added information element of the system information block may be illustrated in FIG. 4-B, and meanings of parameters in the newly added information element illustrated in FIG. 4-B may be illustrated in FIG. 4-C.

402. The UE obtains a current location of the UE.

For example, the UE may obtain the current location of the UE through GNSS measurement, a single-satellite or multi-satellite positioning technology, calculation of an ephemeris message broadcast by a cell, or the like.

403. The UE determines a location status loc_n corresponding to the obtained current location of the UE.

For example, $loc\_n \in \{loc\_0, loc\_1, \ldots, loc\_N\}$.

If the UE cannot obtain the current location of the UE, the UE determines that the current location status of the UE is loc_0 (for example, loc_0 is a default location status, and a satellite cell reselection control parameter set corresponding to loc_0 is a default satellite cell reselection control parameter set).

If the UE can obtain the current location of the UE, the UE obtains a distance L between the current location of the UE and a center of the current serving satellite cell of the UE. The UE determines, from N distance ranges, a distance range within which the distance L falls, where a location status loc_n corresponding to the distance range within which the distance L falls is the location status corresponding to the current location of the UE, and N is an integer greater than 1.

Specifically, for example, refer to FIG. 4-D. When the distance between the UE and the cell center is less than a threshold dis_1, the UE determines that the current location status of the UE is the location state loc_1; when the distance between the UE and the cell center is greater than the threshold dis_1 and less than dis_2, the UE determines that the current location status of the UE is the location state loc_2; when the distance between the UE and the cell center is greater than a threshold dis_N−2 and less than dis_N−1, the UE determines that the current location status of the UE is the location state loc_N−1; and so on.

404. The UE selects, from the N groups of cell reselection control parameter scaling factors, a cell reselection control parameter scaling factor corresponding to the current location status loc_n of the UE. The UE performs scaling adjustment on an initial reselection control parameter set of the satellite cell by using the cell reselection control parameter scaling factor corresponding to the current location status loc_n, to obtain a satellite cell reselection control parameter set corresponding to the current location status loc_n.

For example, ls_n represents the cell reselection control parameter scaling factor. $ls\_n \in \{ls\_0, ls\_1, \ldots, ls\_N\}$ For example, let S_intrasearch=S_intrasearch+ls_n For example, let S_nonintrasearch=S_noninrasearch+ls_n For example, let Qhyst=Qhyst+ls_n For example, let TreselectionRAT=TreselectionRAT*ls_n For example, a cell center area (namely, loc_1) and a cell edge area (namely, loc_N) are used as examples.

When the UE is in the state loc_1, ls_1 corresponding to S_intrasearch may be configured as 0 dB and ls_1 corresponding to TreselectionRAT may be configured as 1.

When the UE is in the state loc_N, ls_N corresponding to S_intrasearch is configured as −4 dB and ls_N corresponding to TreselectionRAT is configured as 0.25. In this case, S_intrasearch=S_intrasearch−4 and TreselectionRAT=TreselectionRAT*0.25.

By analogy, UE on a cell edge has a low intra-frequency measurement threshold and a short reselection trigger time, and therefore, it is easier for the UE in the area to perform cell reselection; however, UE in a cell center has a high intra-frequency measurement threshold and a long reselection trigger time, and therefore, it is more difficult for the UE in the area to perform cell reselection.

405. The UE performs satellite cell reselection control of the UE based on the satellite cell reselection control parameter set corresponding to the current location status loc_n.

For a manner of using the satellite cell reselection control parameter set corresponding to the current location status loc_n, refer to an R criterion and the mechanism illustrated in FIG. 1-C.

It can be learned that, the foregoing example provides a location assistance-based satellite cell reselection mechanism. Because different satellite cell reselection control parameter sets may be designed for different current location statuses, for example, location status corresponds to the cell center has a high measurement threshold and a long trigger time, and location status corresponds to the cell edge has a low measurement threshold and a short trigger time, delivering the cell reselection control parameter scaling factor by the satellite cell by using the system information block and performing satellite cell reselection control of the UE by the UE based on the satellite cell reselection control parameter set corresponding to the current location status enable the currently used satellite cell reselection control parameter set to be better matched with the current location of the UE. It is found through practice that, compared with a conventional mechanism of making a satellite cell reselection decision only based on signal quality strength or reference signal received quality measured by the UE, the foregoing example technical solutions improve a probability that the UE camps on a proper satellite cell.

FIG. 5-A is a schematic flowchart of another satellite cell reselection control method according to an embodiment of this application. The satellite cell reselection control method may include the following steps.

501. UE receives a system information block broadcast by a satellite cell.

The system information block includes N groups of cell reselection control parameter scaling factors, and the N groups of cell reselection control parameter scaling factors are in a one-to-one correspondence with N location statuses.

502. The UE obtains a current location of the UE.

The UE may obtain the current location of the UE through GNSS measurement, a single-satellite or multi-satellite positioning technology, calculation of an ephemeris message broadcast by a cell, or the like.

503. The UE determines a location status loc_n corresponding to the obtained current location of the UE.

loc_n∈{loc_0, loc_1, . . . , loc_N−1}.

If the UE cannot obtain the current location of the UE, the UE determines that the current location status of the UE is loc_0.

If the UE can obtain the current location of the UE, the UE obtains distances between the current location of the UE and N location reference points in the current serving satellite cell of the user equipment; and when a distance between the current location of the user equipment and a location reference point x in the N location reference points is less than a distance between the current location of the user equipment and any other location reference point in the N location reference points, the UE determines that a location status loc_n corresponding to the location reference point x is the location status corresponding to the current location of the UE, where N is an integer greater than 1.

Specifically, for example, refer to FIG. 5-B. When a distance between the current location of the UE and a location reference point Loc-6 is less than a distance between the current location of the UE and any other location reference point in the N location reference points, the UE determines that a location status corresponding to the location reference point Loc-6 is the location status corresponding to the current location of the UE, where N is an integer greater than 1. The rest may be deduced by analogy.

504. The UE selects, from the N groups of cell reselection control parameter scaling factors, a cell reselection control parameter scaling factor corresponding to the current location status loc_n of the UE. The UE performs scaling adjustment on an initial reselection control parameter set of the satellite cell by using the cell reselection control parameter scaling factor corresponding to the current location status loc_n of the UE, to obtain a satellite cell reselection control parameter set corresponding to the current location status loc_n.

For example, ls_n represents the cell reselection control parameter scaling factor. ls_n∈{ls_0, ls_1, . . . , ls_N}

For example, let S_intrasearch=S_intrasearch+ls_n

For example, let S_nonintrasearch=S_noninrasearch+ls_n

For example, let Qhyst=Qhyst+ls_n

For example, let TreselectionRAT=TreselectionRAT*ls_n

For example, a cell center area (that is, loc_1) and a cell edge area (that is, loc_N) are used as examples.

When the UE is in the state loc_1, ls_1 corresponding to S_intrasearch may be configured as 0 dB and ls_1 corresponding to TreselectionRAT may be configured as 1.

When the UE is in the state loc_N, ls_N corresponding to S_intrasearch is configured as −4 dB and ls_N corresponding to TreselectionRAT is configured as 0.25. In this case, S_intrasearch=S_intrasearch−4 and TreselectionRAT=TreselectionRAT*0.25.

By analogy, UE on a cell edge has a low intra-frequency measurement threshold and a short reselection trigger time, and therefore, it is easier for the UE in the area to perform cell reselection; however, UE in a cell center has a high intra-frequency measurement threshold and a long reselection trigger time, and therefore, it is more difficult for the UE in the area to perform cell reselection.

505. The UE performs satellite cell reselection control of the UE based on the satellite cell reselection control parameter set corresponding to the current location status loc_n.

For a manner of using the satellite cell reselection control parameter set corresponding to the current location status loc_n, refer to an R criterion and the mechanism illustrated in FIG. 1-C.

It can be learned that, the foregoing example provides a location assistance-based satellite cell reselection mechanism. Because different satellite cell reselection control parameter sets may be designed for different current location statuses, for example, location status corresponds to the cell center has a high measurement threshold and a long trigger time, and location status corresponds to the cell edge has a low measurement threshold and a short trigger time, delivering the cell reselection control parameter scaling factor by the satellite cell by using the system information block and performing satellite cell reselection control of the UE by the UE based on the satellite cell reselection control parameter set corresponding to the current location status enable the currently used satellite cell reselection control parameter set to be better matched with the current location of the UE. It is found through practice that, compared with a conventional mechanism of making a satellite cell reselection decision only based on signal quality strength or reference signal received quality measured by the UE, the foregoing example solutions improve validity of performing reselection and measurement by the UE in the satellite cell and further improve a probability that the UE camps on a proper satellite cell.

FIG. 6-A is a schematic flowchart of another satellite cell reselection control method according to an embodiment of this application. The satellite cell reselection control method may include the following steps.

601. UE receives a system information block broadcast by a satellite cell.

The system information block includes N groups of cell reselection control parameter sets, and the N groups of cell reselection control parameter sets are in a one-to-one correspondence with N location statuses.

A format of a newly added information element of the system information block may be illustrated in FIG. 6-B, and meanings of parameters in the newly added information element illustrated in FIG. 6-B may be illustrated in FIG. 6-C.

602. The UE obtains a current location of the UE.

The UE may obtain the current location of the UE through GNSS measurement, a single-satellite or multi-satellite positioning technology, calculation of an ephemeris message broadcast by a cell, or the like.

603. The UE determines a location status loc_n corresponding to the obtained current location of the UE.

loc_n∈{loc_0, loc_1, . . . , loc_N−1}.

If the UE cannot obtain the current location of the UE, the UE determines that the current location status of the UE is loc_0.

If the UE can obtain the current location of the UE, the UE obtains a distance L between the current location of the UE and a center of the current serving satellite cell of the UE; and determines, from N distance ranges, a distance range within which the distance L falls, where a location status loc_n corresponding to the distance range within which the distance L falls is the location status corresponding to the current location of the UE, and N is an integer greater than 1.

Specifically, for example, when the distance between the UE and the cell center is less than a threshold dis_1, the UE determines that the current location status of the UE is the location state loc_1; when the distance between the UE and the cell center is greater than the threshold dis_1 and less than dis_2, the UE determines that the current location status of the UE is the location state loc_2; when the distance between the UE and the cell center is greater than a threshold dis_N−2 and less than dis_N−1, the UE determines that the current location status of the UE is the location state loc_N−1; and so on.

604. The UE selects, from the N groups of cell reselection control parameter sets, a cell reselection control parameter set corresponding to the current location status loc_n of the UE.

For example, loc_1 represents a cell center area and loc_N represents a cell edge area.

A user on a cell edge has a low intra-frequency measurement threshold and a short reselection trigger time, and therefore, it is easier for the UE in the area to perform cell reselection; however, a user in a cell center has a high intra-frequency measurement threshold and a long reselection trigger time, and therefore, it is more difficult for the UE in the area to perform cell reselection.

605. The UE performs satellite cell reselection control of the UE based on the satellite cell reselection control parameter set corresponding to the current location status loc_n.

For a manner of using the satellite cell reselection control parameter set corresponding to the current location status loc_n, refer to an R criterion and the mechanism illustrated in FIG. 1-C.

It can be learned that, the foregoing example provides a location assistance-based satellite cell reselection mechanism. Because different satellite cell reselection control parameter sets may be designed for different current location statuses, for example, location status corresponds to the cell center has a high measurement threshold and a long trigger time, and location status corresponds to the cell edge has a low measurement threshold and a short trigger time, delivering the cell reselection control parameter set by the satellite cell by using the system information block and performing satellite cell reselection control of the UE by the UE based on the satellite cell reselection control parameter set corresponding to the current location status enable the currently used satellite cell reselection control parameter set to be better matched with the current location of the UE. It is found through practice that, compared with a conventional mechanism of making a satellite cell reselection decision only based on signal quality strength or reference signal received quality measured by the UE, the foregoing example solutions improve validity of performing reselection and measurement by the UE in the satellite cell and further improve a probability that the UE camps on a proper satellite cell.

Figure 7:
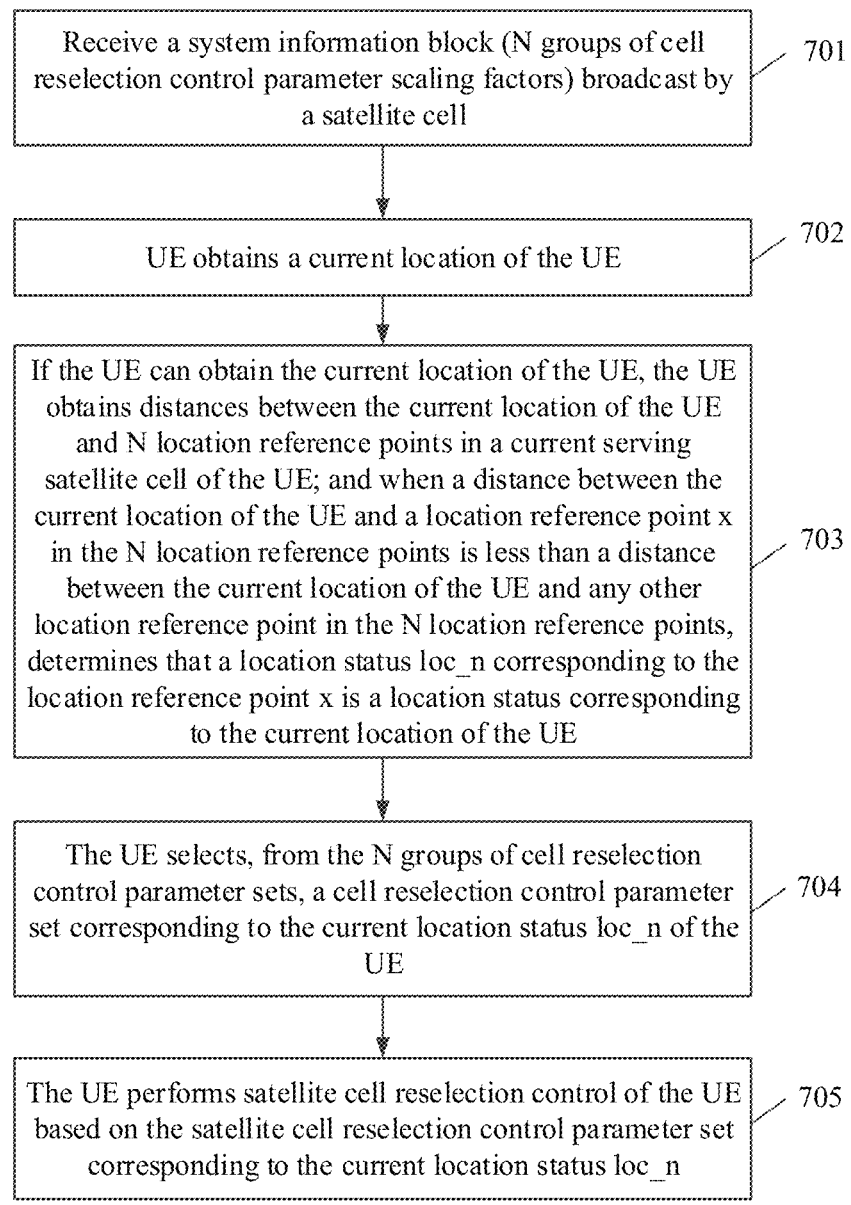
FIG. 7 is a schematic flowchart of another satellite cell reselection control method according to an embodiment of this application.

FIG. 7 is a schematic flowchart of another satellite cell reselection control method according to an embodiment of this application. The satellite cell reselection control method may include the following steps.

701. UE receives a system information block broadcast by a satellite cell.

The system information block includes N groups of cell reselection control parameter sets, and the N groups of cell reselection control parameter sets are in a one-to-one correspondence with N location statuses.

702. The UE obtains a current location of the UE.

The UE may obtain the current location of the UE through GNSS measurement, a single-satellite or multi-satellite positioning technology, calculation of an ephemeris message broadcast by a cell, or the like.

703. The UE determines a location status loc_n corresponding to the obtained current location of the UE.

loc_n∈{loc_0, loc_1, . . . , loc_N−1}.

If the UE cannot obtain the current location of the UE, the UE determines that the current location status of the UE is loc_0.

If the UE can obtain the current location of the UE, the UE obtains distances between the current location of the UE and N location reference points in the current serving satellite cell of the UE; and when a distance between the current location of the UE and a location reference point x in the N location reference points is less than a distance between the current location of the UE and any other location reference point in the N location reference points, the UE determines that a location status corresponding to the location reference point x is the location status corresponding to the current location of the UE, where N is an integer greater than 1.

Specifically, for example, when a distance between the current location of the UE and a location reference point Loc-6 is less than a distance between the current location of the UE and any other location reference point in the N location reference points, the UE determines that a location status corresponding to the location reference point Loc-6 is the location status corresponding to the current location of the UE, where N is an integer greater than 1. The rest may be deduced by analogy.

704. The UE selects, from the N groups of cell reselection control parameter sets, a cell reselection control parameter set corresponding to the current location status loc_n of the UE.

For example, loc_1 represents a cell center area and loc_N represents a cell edge area.

A user on a cell edge has a low intra-frequency measurement threshold and a short reselection trigger time, and therefore, it is easier for the UE in the area to perform cell reselection; however, a user in a cell center has a high intra-frequency measurement threshold and a long reselection trigger time, and therefore, it is more difficult for the UE in the area to perform cell reselection.

705. The UE performs satellite cell reselection control of the UE based on the satellite cell reselection control parameter set corresponding to the current location status loc_n.

For a manner of using the satellite cell reselection control parameter set corresponding to the current location status loc_n, refer to an R criterion and the mechanism illustrated in FIG. 1-C.

It can be learned that, the foregoing example provides a location assistance-based satellite cell reselection mechanism. Because different satellite cell reselection control parameter sets may be designed for different current location statuses, for example, location status corresponds to the cell center has a high measurement threshold and a long trigger time, and location status corresponds to the cell edge has a low measurement threshold and a short trigger time, delivering the cell reselection control parameter set by the satellite cell by using the system information block and performing satellite cell reselection control of the UE by the UE based on the satellite cell reselection control parameter set corresponding to the current location status enable the currently used satellite cell reselection control parameter set to be better matched with the current location of the UE. It is found through practice that, compared with a conventional mechanism of making a satellite cell reselection decision only based on signal quality strength or reference signal received quality measured by the UE, the foregoing example solutions improve validity of performing reselection and measurement by the UE in the satellite cell and further improve a probability that the UE camps on a proper satellite cell.

Figure 8:
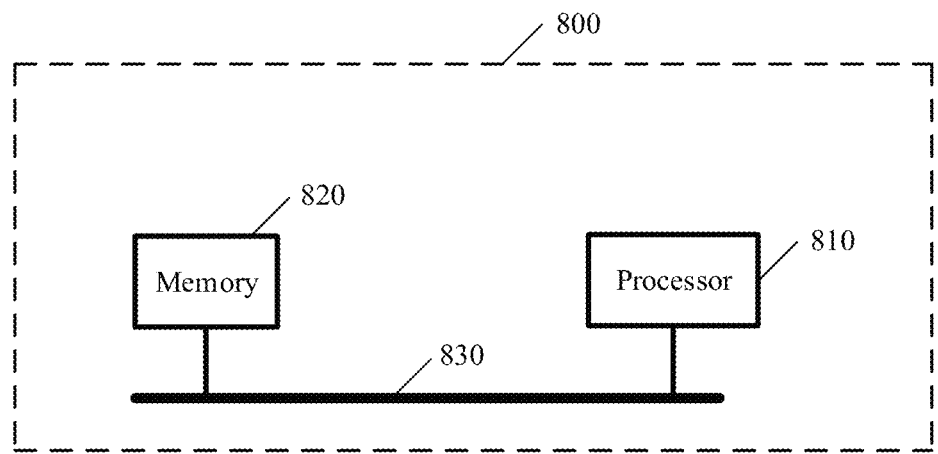
FIG. 8 is a schematic diagram of a structure of user equipment according to an embodiment of this application.

Refer to FIG. 8. User equipment 800 according to an embodiment of this application includes: a processor 810 and a memory 820 that are coupled to each other. A communication interface may be further coupled. For example, the processor 810, the communication interface, and the memory 820 are coupled by using a bus.

The memory 820 may include but is not limited to a random access memory (RAM), an erasable programmable read-only memory (EPROM), a read-only memory (ROM), a compact disc read-only memory (CD-ROM), and the like. The memory 820 is configured to store related instructions and data.

The processor 810 may be one or more central processing units (CPU). When the processor 810 is a CPU, the CPU may be a single-core CPU or a multi-core CPU.

In addition, the processor 810 may invoke different computer programs stored in the memory 820, to complete some or all of the steps of any method performed by an NFVO or a container management entity in the embodiments of this application The processor 810 is also referred to as a central processing unit (CPU). In specific application, components of the user equipment are coupled together, for example, by using a bus system. In addition to a data bus, the bus system may further include a power bus, a control bus, a status signal bus, and the like. However, for clarity of description, various buses are marked as a bus system 830 in the figure. The methods disclosed in the embodiments of this application may be applied to the processor 810, or may be implemented by the processor 810. The processor 810 may be an integrated circuit chip and has a signal processing capability. In some implementation processes, some or all of the steps in the foregoing methods can be implemented by using an integrated logical circuit of hardware in the processor 810, or by using instructions in a form of software. The processor 810 may be a general-purpose processor, a digital signal processor, an application-specific integrated circuit, a field programmable gate array or another programmable logic device, a discrete gate or a transistor logic device, or a discrete hardware component. The processor 810 may implement or perform methods, steps, and logical block diagrams disclosed in the embodiments of this application. The general-purpose processor 810 may be a microprocessor, or the processor may be any conventional processor, or the like. Steps of the methods disclosed in the embodiments of this application may be directly performed and completed by a hardware decoding processor, or may be performed and completed by using a combination of hardware in the decoding processor and a software module. A software module may be located in a mature storage medium in the art, for example, a random access memory, a flash memory, a read-only memory, a programmable read-only memory, an electrically erasable programmable memory, or a register. The storage medium is located in the memory 820. For example, the processor 810 may read information from the memory 820, and complete some or all of the steps in the foregoing methods in combination with hardware of the processor 810.

Specifically, for example, the processor 810 may be configured to: determine a current location status of the user equipment; obtain a satellite cell reselection control parameter set corresponding to the current location status; and perform satellite cell reselection control of the user equipment based on the obtained satellite cell reselection control parameter set.

In some possible implementations, the processor 810 may be further configured to receive a system information block broadcast by a satellite cell, where the system information block includes N groups of cell reselection control parameter scaling factors, and the N groups of cell reselection control parameter scaling factors are in a one-to-one correspondence with N location statuses. The obtaining a satellite cell reselection control parameter set corresponding to the current location status includes: selecting, from the N groups of cell reselection control parameter scaling factors, a cell reselection control parameter scaling factor corresponding to the current location status of the user equipment; and performing scaling adjustment on an initial reselection control parameter set of the satellite cell by using the cell reselection control parameter scaling factor corresponding to the current location status of the user equipment, to obtain the satellite cell reselection control parameter set corresponding to the current location status.

For example, the cell reselection control parameter scaling factor is used to perform scaling adjustment on one or more of the following cell reselection control parameters: S_intrasearch, Qhyst, S_nonintrasearch, and TreselectionRAT.

For example, let S_intrasearch=S_intrasearch−4.

For another example, let TreselectionRAT=TreselectionRAT*0.25.

In other possible implementations, the processor 810 may be configured to receive a system information block broadcast by a satellite cell, where the system information block includes N groups of cell reselection control parameter sets, and the N groups of cell reselection control parameter sets are in a one-to-one correspondence with N location statuses. The obtaining a satellite cell reselection control parameter set corresponding to the current location status includes: selecting, from the N groups of cell reselection control parameter sets, the cell reselection control parameter set corresponding to the current location status.

In some possible implementations, that the processor 810 determines a current location status of the user equipment may include: obtaining a current location of the user equipment; and determining a location status corresponding to the obtained current location of the user equipment, where the determined location status is the current location status of the user equipment.

The processor 810 may obtain the current location of the user equipment through GNSS measurement, a single-satellite or multi-satellite positioning technology, calculation of an ephemeris message broadcast by a cell, or the like.

In some possible implementations, the determining a location status corresponding to the obtained current location of the user equipment may include: obtaining a distance L between the current location of the user equipment and a center of the current serving satellite cell of the user equipment; and determining, from N distance ranges, a distance range within which the distance L falls, where a location status corresponding to the distance range within which the distance L falls is the location status corresponding to the current location of the user equipment, and N is an integer greater than 1.

In some possible implementations, the determining a location status corresponding to the obtained current location of the user equipment includes: obtaining distances between the current location of the user equipment and N location reference points in the current serving satellite cell of the user equipment; and when a distance between the current location of the user equipment and a location reference point x in the N location reference points is less than a distance between the current location of the user equipment and any other location reference point in the N location reference points, determining that a location status corresponding to the location reference point x is the location status corresponding to the current location of the user equipment, where N is an integer greater than 1.

Figure 9:
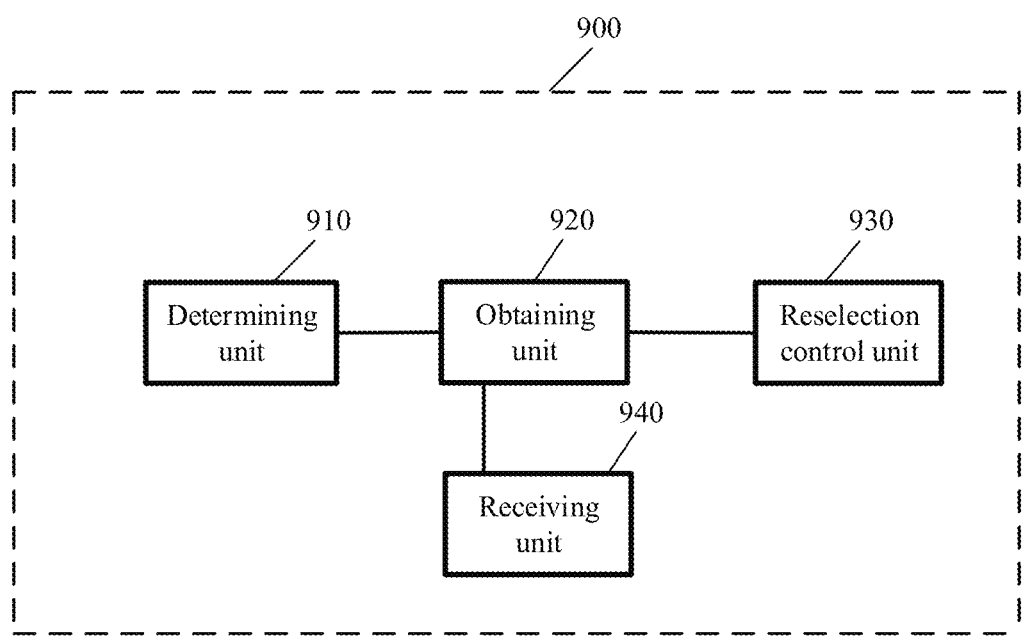
FIG. 9 is a schematic diagram of a structure of another type of user equipment according to an embodiment of this application.

Refer to FIG. 9. An embodiment of this application provides another type of user equipment 900, including:

a determining unit 910, configured to determine a current location status of the user equipment;

an obtaining unit 920, configured to obtain a satellite cell reselection control parameter set corresponding to the current location status; and a reselection control unit 930, configured to perform satellite cell reselection control of the user equipment based on the obtained satellite cell reselection control parameter set.

In some possible implementations, the determining unit 910 is specifically configured to: obtain a current location of the user equipment; and determine a location status corresponding to the obtained current location of the user equipment, where the determined location status is the current location status of the user equipment.

In some possible implementations, that the determining unit 910 determines a location status corresponding to the obtained current location of the user equipment includes:

obtaining a distance L between the current location of the user equipment and a center of a current serving satellite cell of the user equipment; and determining, from N distance ranges, a distance range within which the distance L falls, where a location status corresponding to the distance range within which the distance L falls is the location status corresponding to the current location of the user equipment, and N is an integer greater than 1.

In some possible implementations, that the determining unit determines a location status corresponding to the obtained current location of the user equipment includes: obtaining distances between the current location of the user equipment and N location reference points in a current serving satellite cell of the user equipment; and when a distance between the current location of the user equipment and a location reference point x in the N location reference points is less than a distance between the current location of the user equipment and any other location reference point in the N location reference points, determining that a location status corresponding to the location reference point x is the location status corresponding to the current location of the user equipment, where N is an integer greater than 1.

In some possible implementations, the user equipment further includes a receiving unit 940, configured to receive a system information block broadcast by the satellite cell, where the system information block includes N groups of cell reselection control parameter scaling factors, and the N groups of cell reselection control parameter scaling factors are in a one-to-one correspondence with N location statuses; and the obtaining unit is specifically configured to: select, from the N groups of cell reselection control parameter scaling factors, a cell reselection control parameter scaling factor corresponding to the current location status of the user equipment; and perform scaling adjustment on an initial reselection control parameter set of the satellite cell by using the cell reselection control parameter scaling factor corresponding to the current location status of the user equipment, to obtain the satellite cell reselection control parameter set corresponding to the current location status.

In some possible implementations, for example, the cell reselection control parameter scaling factor may be used to perform scaling adjustment on one or more of the following cell reselection control parameters: S_intrasearch, Qhyst, S_nonintrasearch, and TreselectionRAT.

In some possible implementations, the user equipment further includes a receiving unit 940, configured to receive a system information block broadcast by the satellite cell, where the system information block includes N groups of cell reselection control parameter sets, and the N groups of cell reselection control parameter sets are in a one-to-one correspondence with N location statuses.

The obtaining unit is specifically configured to select, from the N groups of cell reselection control parameter sets, the cell reselection control parameter set corresponding to the current location status.

Figure 10:
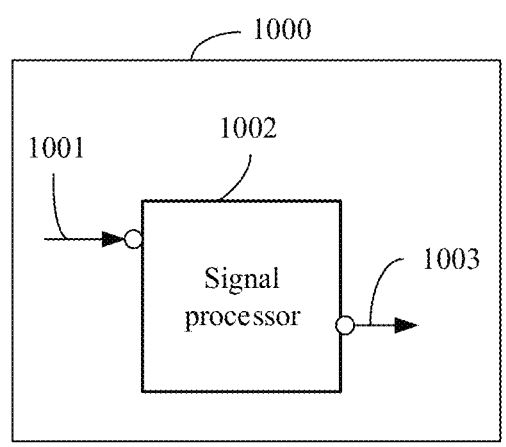
FIG. 10 is a schematic diagram of a structure of a communication apparatus according to an embodiment of this application.

FIG. 10 is a schematic structural diagram of a communication apparatus 1000 according to this application. The communication apparatus 1000 is, for example, user equipment. The communication apparatus 1000 may include:

at least one input end 1001, a signal processor 1002, and at least one output end 1003.

The at least one input end 1001 is configured to input a signal.

The at least one output end 1003 is configured to output a signal.

The signal processor 1002 is configured to perform some or all steps of any method provided in the embodiments of this application.

For example, the signal processor 1002 may be configured to: determine a current location status of the communication apparatus; obtain a satellite cell reselection control parameter set corresponding to the current location status; and perform satellite cell reselection control of the communication apparatus 1000 based on the obtained satellite cell reselection control parameter set.

An embodiment of this application further provides a computer-readable storage medium. The computer-readable storage medium stores a computer program, and the computer program is executed by hardware (for example, a processor), to perform some or all of the steps of any method performed by any device in the embodiments of this application.

An embodiment of this application further provides a computer program product including instructions. When the computer program product is run on a computer device, the computer device is enabled to perform some or all of the steps of any method in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid state drive), or the like. In the foregoing embodiments, descriptions of the embodiments have respective focuses. For a part that is not described in detail in an embodiment, refer to related descriptions in other embodiments.

In the foregoing embodiments, descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, division into unit is merely logical function division or may be other division in actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located in one position or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disk.

What is claimed is:

1. A method for satellite cell reselection control, comprising:
    determining a current location of user equipment;
    determining distances between a current location of a user equipment and N location reference points in a current serving satellite cell of the user equipment;
    determining that a distance between the current location of the user equipment and a location reference point x in the N location reference points is less than a distance between the current location of the user equipment and any location reference point in the N location reference points other than the location reference point x, wherein N is an integer greater than 1;
    determining a location status corresponding to the location reference point x as a current location status;
    determining, based on the current location status, a satellite cell reselection control parameter set corresponding to the current location status, wherein the satellite cell reselection control parameter set includes at least one cell reselection control parameter, and wherein the at least one cell reselection control parameter is at least one of an intra-frequency measurement threshold, a serving cell hysteresis value, an inter-frequency/inter-system measurement threshold, or a cell reselection timer value; and
    performing satellite cell reselection control based on the satellite cell reselection control parameter set.

2. The method according to claim 1, wherein determining the current location status comprises:
    determining a distance L between the current location of the user equipment and a center of a current serving satellite cell of the user equipment; and
    determining, from N distance ranges, a distance range within which the distance L falls, wherein the current location status is a location status corresponding to the distance range within which the distance L falls, wherein N is an integer greater than 1 and L is a positive number.

3. The method according to claim 1, wherein the method further comprises: receiving, by the user equipment, a system information block sent by a satellite cell, wherein the system information block comprises N groups of cell reselection control parameter scaling factors, and the N groups of cell reselection control parameter scaling factors are in a one-to-one correspondence with N location statuses, and wherein determining the satellite cell reselection control parameter set comprises:
    selecting, from the N groups of cell reselection control parameter scaling factors, a cell reselection control parameter scaling factor corresponding to the current location status of the user equipment; and
    performing scaling adjustment on an initial reselection control parameter set of the satellite cell by using the cell reselection control parameter scaling factor corresponding to the current location status of the user equipment to determine the satellite cell reselection control parameter set corresponding to the current location status.

4. The method according to claim 3, wherein the cell reselection control parameter scaling factor is configured to perform scaling adjustment on the cell reselection control parameter set.

5. The method according to claim 1, wherein the method further comprises:
receiving, by the user equipment, a system information block broadcast by a satellite cell, wherein the system information block comprises N groups of cell reselection control parameter sets, and the N groups of cell reselection control parameter sets are in a one-to-one correspondence with N location statuses, wherein obtaining a satellite cell reselection control parameter set corresponding to the current location status comprises:
selecting, from the N groups of cell reselection control parameter sets, the cell reselection control parameter set corresponding to the current location status.

6. An apparatus, comprising:
at least one processor; and
a memory coupled to the at least one processor and storing programming instructions for execution by the at least one processor and instruct the at least one processor to:
determine a current location of user equipment;
determine distances between a current location of a user equipment and N location reference points in a current serving satellite cell of the user equipment;
determine that a distance between the current location of the user equipment and a location reference point x in the N location reference points is less than a distance between the current location of the user equipment and any location reference point in the N location reference points other than the location reference point x, wherein N is an integer greater than 1;
determine a location status corresponding to the location reference point x as a current location status;
determine, based on the current location status, a satellite cell reselection control parameter set corresponding to the current location status, wherein the satellite cell reselection control parameter set includes at least one cell reselection control parameter, and wherein the at least one cell reselection control parameter is at least one of an intra-frequency measurement threshold, a serving cell hysteresis value, an inter-frequency/inter-system measurement threshold, or a cell reselection timer value; and
perform satellite cell reselection control based on the satellite cell reselection control parameter set.

7. The apparatus according to claim 6, wherein the programming instructions instruct the at least one processor to:
determine a distance L between the current location of the apparatus and a center of a current serving satellite cell of the apparatus; and
determine, from N distance ranges, a distance range within which the distance L falls, wherein the current location status is a location status corresponding to the distance range within which the distance L falls, wherein N is an integer greater than 1 and L is a positive number.

8. The apparatus according to claim 6, wherein the programming instructions instruct the at least one processor to:
receive a system information block sent by a satellite cell, wherein the system information block comprises N groups of cell reselection control parameter scaling factors, and the N groups of cell reselection control parameter scaling factors are in a one-to-one correspondence with N location statuses;
select, from the N groups of cell reselection control parameter scaling factors, a cell reselection control parameter scaling factor corresponding to the current location status of the apparatus; and
perform scaling adjustment on an initial reselection control parameter set of the satellite cell by using the cell reselection control parameter scaling factor corresponding to the current location status of the apparatus, to determine the satellite cell reselection control parameter set corresponding to the current location status.

9. The apparatus according to claim 8, wherein the cell reselection control parameter scaling factor is configured to perform scaling adjustment on the cell reselection control parameter set.

10. The apparatus according to claim 6, wherein the programming instructions instruct the at least one processor to:
receive a system information block broadcast by a satellite cell, wherein the system information block comprises N groups of cell reselection control parameter sets, and the N groups of cell reselection control parameter sets are in a one-to-one correspondence with N location statuses; and
select, from the N groups of cell reselection control parameter sets, the cell reselection control parameter set corresponding to the current location status.

11. A non-transitory, computer-readable storage medium storing one or more programming instructions executable by at least one processor and instruct the at least one processor to:
determine a current location of user equipment;
determine distances between a current location of a user equipment and N location reference points in a current serving satellite cell of the user equipment;
determine that a distance between the current location of the user equipment and a location reference point x in the N location reference points is less than a distance between the current location of the user equipment and any location reference point in the N location reference points other than the location reference point x, wherein N is an integer greater than 1;
determine a location status corresponding to the location reference point x as a current location status;
determine, based on the current location status, a satellite cell reselection control parameter set corresponding to the current location status, wherein the satellite cell reselection control parameter set includes at least one cell reselection control parameter, and wherein the at least one cell reselection control parameter is at least one of an intra-frequency measurement threshold, a serving cell hysteresis value, an inter-frequency/inter-system measurement threshold, or a cell reselection timer value; and
perform satellite cell reselection control based on the satellite cell reselection control parameter set.

12. The non-transitory, computer-readable storage medium according to claim 11, wherein the one or more programming instructions instruct the at least one processor:
determine a distance L between the current location of the user equipment and a center of a current serving satellite cell of the user equipment; and
determine, from N distance ranges, a distance range within which the distance L falls, wherein the current location status is a location status corresponding to the distance range within which the distance L falls, wherein N is an integer greater than 1 and L is a positive number.

13. The non-transitory, computer-readable storage medium according to claim 11, wherein the one or more programming instructions instruct the at least one processor:
- receive a system information block sent by a satellite cell, wherein the system information block comprises N groups of cell reselection control parameter sets, and the N groups of cell reselection control parameter sets are in a one-to-one correspondence with N location statuses;
- select from the N groups of cell reselection control parameter sets, the cell reselection control parameter set corresponding to the current location status; and
- perform scaling adjustment on an initial reselection control parameter set of the satellite cell by using the cell reselection control parameter scaling factor corresponding to the current location status of the user equipment, to determine the satellite cell reselection control parameter set corresponding to the current location status.

14. The non-transitory, computer-readable storage medium according to claim 13, wherein the cell reselection control parameter scaling factor is configured to perform scaling adjustment on the cell reselection control parameter set.

* * * * *

UNITED STATES PATENT AND TRADEMARK OFFICE
CERTIFICATE OF CORRECTION

PATENT NO. : 12,231,223 B2
APPLICATION NO. : 17/564643
DATED : February 18, 2025
INVENTOR(S) : Yu Wang et al.

Page 1 of 1

It is certified that error appears in the above-identified patent and that said Letters Patent is hereby corrected as shown below:

In the Claims

In Column 24, In Line 66, In Claim 12, delete "Nis" and insert -- N is --.

Signed and Sealed this
Fifteenth Day of July, 2025

Coke Morgan Stewart
*Acting Director of the United States Patent and Trademark Office*